United States Patent
Ishii et al.

(10) Patent No.: US 8,060,090 B2
(45) Date of Patent: Nov. 15, 2011

(54) MOBILE STATION AND HANDOVER CONTROL METHOD

(75) Inventors: Hiroyuki Ishii, Yokosuka (JP); Yousuke Iizuka, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 864 days.

(21) Appl. No.: 11/780,961

(22) Filed: Jul. 20, 2007

(65) Prior Publication Data

US 2008/0311910 A1 Dec. 18, 2008

(30) Foreign Application Priority Data

Jul. 20, 2006 (JP) ................ P2006-198720

(51) Int. Cl.
*H04Q 7/20* (2006.01)

(52) U.S. Cl. ........ 455/436; 455/442; 455/522; 455/560; 370/331

(58) Field of Classification Search .......... 455/436–439, 455/442, 522, 560; 370/331, 332
See application file for complete search history.

(56) References Cited

U.S. PATENT DOCUMENTS

| | | | |
|---|---|---|---|
| 7,079,859 B2* | 7/2006 | Nobukiyo et al. | 455/522 |
| 7,206,596 B2* | 4/2007 | Nishio | 455/522 |
| 7,328,019 B2* | 2/2008 | Nishikawa et al. | 455/436 |
| 7,701,906 B2* | 4/2010 | Ishikawa et al. | 370/332 |
| 2003/0083070 A1 | 5/2003 | Ishikawa et al. | |
| 2004/0266472 A1 | 12/2004 | Ben Rached et al. | |
| 2005/0215255 A1* | 9/2005 | Tanoue | 455/436 |
| 2005/0250497 A1* | 11/2005 | Ghosh et al. | 455/436 |
| 2006/0046765 A1* | 3/2006 | Kogure | 455/522 |
| 2006/0176858 A1 | 8/2006 | Ishii et al. | |
| 2007/0147295 A1 | 6/2007 | Ishikawa et al. | |
| 2009/0275337 A1* | 11/2009 | Maeda et al. | 455/442 |

FOREIGN PATENT DOCUMENTS

| | | |
|---|---|---|
| CN | 1416288 A | 5/2003 |
| EP | 1 309 215 A2 | 5/2003 |
| JP | 2000-197092 | 7/2000 |
| JP | 2002-330461 | 11/2002 |
| JP | 2005-45316 | 2/2005 |
| WO | WO 02/054819 A1 | 7/2002 |
| WO | WO 2004/057887 A1 | 7/2004 |
| WO | WO 2006/000876 A1 | 1/2006 |
| WO | WO 2006/035297 A2 | 4/2006 |

OTHER PUBLICATIONS

"Universal Mobile Telecommunications System (UMTS); UTRA High Speed Downlink Packet Access (HSDPA)" ETSI TS 125 308, v7.7.0.0 Mar. 2006, pp. 1-31.

(Continued)

*Primary Examiner* — Cong Tran
(74) *Attorney, Agent, or Firm* — Oblon, Spivak, McClelland, Maier & Neustadt, L.L.P.

(57) ABSTRACT

A mobile station includes a handover controller. When the mobile station simultaneously communicates with a plurality of radio base stations by using first channels and communicates only with a certain one of the plurality of radio base stations by using a second communication channel, and even when the radio quality of the certain radio base station communicating by using the second communication channel becomes deteriorated, the handover controller maintains communications with the certain radio base station communicating by using the second communication channel.

9 Claims, 11 Drawing Sheets

OTHER PUBLICATIONS

"3rd Generation Partnership Project; Technical Specification Group Radio Access Network; High Speed Downlink Packet Access (HSDPA); Overall description; Stage 2 (Release 5)", 3GPP TS 25.308, V5.7.0, Dec. 2004, 28 Pages, <http://www.3gpp.org>.

"3rd Generation Partnership Project; Technical Specification Group Radio Access Network; Radio Resource Control (RRC); Protocol Specification (Release 6)", 3GPP TS 25.331, V6.10.0, Jun. 2006, 1226 Pages, <http://www.3gpp.org>.

Office Action issued Feb. 8, 2011 in Japan Application No. 2006-198720 (With English Translation).

"3rd Generation Partnership Project; Technical Specification Group Radio Access Network; High Speed Downlink Packet Access (HSDPA); Stage 2 (Release 7)", 3GPP TS 25.308 V7.0.0, 2006, 28 pages.

"HS-DSCH mobility definitions", Ericsson, 3GPP TSG-RAN WG2 meeting #24, Oct. 22-26, 2001, pp. 1-4.

* cited by examiner

MOBILE STATION AND HANDOVER CONTROL METHOD

CROSS REFERENCE TO RELATED APPLICATIONS

This application is based upon and claims the benefit of priority from the prior Japanese Patent Application No. P2006-198720, filed on Jul. 20, 2006; the entire contents of which are incorporated herein by reference.

BACKGROUND OF THE INVENTION

1. Field of the Invention

The present invention relates to a mobile station and a handover control method.

2. Description of the Related Art

In a mobile communication system using a CDMA scheme, a mobile station generally performs soft handover (SHO) to improve reception quality in a peripheral area of a cell. In SHO, the mobile station communicates with multiple radio base stations (or cells/sectors) with radio links connected therebetween. In general, the radio link between the mobile station and each of the radio base stations is called a branch, and a set of the multiple radio base stations having communications made through the radio links in SHO is called an active set. In addition, branch addition indicates an event where a radio base station, which is to communicate through a radio link, is newly added to the active set, and branch exclusion indicates an event in which a radio base station already communicating through a radio link is excluded from the active set. Moreover, branch replacement indicates an event in which the radio base station having the poorest radio quality in the active set is replaced with a radio base station not included in the active set but having better radio quality when the number of radio base stations in the active set exceeds a predetermined value.

For example, in the WCDMA of 3GPP, a mobile station monitors radio quality (for example, CPICH RSCP, CPICH Ec/N0 and pathloss) between the mobile station and each of the radio base station, makes a determination on branch addition, branch exclusion and branch replacement by using the radio quality, and then reports the determination result to a radio control station. Then, the radio control station makes a control for SHO according to the content reported from the mobile station.

In the 3GPP TS25.331, V6.10.0, the aforementioned operations of the mobile station for reporting the branch addition, branch exclusion and branch replacement are denoted by reporting event 1A, reporting event 1B and reporting event 1C, respectively.

Hereinafter, the operation of the mobile station for the branch replacement will be described with reference to FIG. 1.

In FIG. 1, assume that the maximum number of radio base stations in an active set is 3, and that a foregoing predetermined value for performing the branch replacement is 3. Incidentally, the foregoing predetermined value is defined as a replacement activation threshold in 3GPP TS25.331, v6.10.0.

FIG. 1 shows an example of transitions of common pilot channels' received signal code powers CPICH RSCPs in the mobile station from radio base stations 1 to 4. At a time period of T1 to T2, the mobile station communicates with the radio base stations 1 to 3 by using SHO. In other words, the radio base stations in the active set are the radio base stations 1 to 3. Then, at the time point T2, a value obtained by subtracting the CPICH RSCP of the radio base station 2 having the weakest CPICH RSCP in the active set from the CPICH RSCP of the radio base station 4 exceeds a predetermined threshold Th. Accordingly, the mobile station determines that the radio base station 2 in the active set should be replaced with the radio base station 4, and reports the determination result to the radio control station. In short, the mobile station carries out the reporting event 1C. Here, the threshold Th is defined as H1c/2 (H1c: the hysteresis parameter for the event 1c) in the 3GPP TS25.331, V6.10.0.

Note that a time-to-trigger and the cell individual offsets described in the 3GPP TS25.331, V6.10.0 are set to 0 in the foregoing operation of the branch replacement in order to simplify the description. In addition, the description that "a value obtained by subtracting the CPICH RSCP of the radio base station 2 having the weakest CPICH RSCP in the active set from the CPICH RSCP of the radio base station 4 exceeds a predetermined threshold Th" has the same meaning as that the following formula is true.

$$CPICH\_RSCP_4 \geq CPICH\_RSCP_2 + Th$$

Here, $CPICH\_RSCP_4$ is the CPICH RSCP of the radio base station 4, and $CPICH\_RSCP_2$ is the CPICH RSCP of the radio base station 2. Moreover, although only one radio base station is reported for each of two categories of radio base stations, that is, one having a strong CPICH RSCP not in the active set and the other one having a weak CPICH RSCP in the active set, in the foregoing example, multiple radio base stations may be reported for each of the two categories.

Even when a propagation environment is changed, the mobile station can make communications using SHO with appropriate radio base stations by performing the foregoing determinations for the branch addition, the branch exclusion and the branch replacement.

Meanwhile, the standardization of high speed downlink packet access (HSDPA) that is a high speed packet transmission scheme in downlink is in progress in 3GPP, on the basis of the prediction that, along with recent rapid spread of the Internet, the traffic of high speed and large capacity transmission increases especially in downlink because of downloads and the like from databases and websites (see 3GPP TS25.308, v5.7.0, for example).

In downlink of HSDPA, used are a high speed-physical downlink shared channel (HS-PDSCH), a high speed-shared control channel (HS-SCCH) and an associated-dedicated physical channel (A-DPCH). To be more precise, the HS-PDSCH and HS-SCCH are used and shared by multiple mobile stations, while the A-DPCH is allocated to each mobile station individually and is associated with the HS-PDSCH.

SUMMARY OF THE INVENTION

When making communications with HSDPA, the mobile station communicates with multiple radio base stations by using SHO through radio links on the A-DPCHs that are associated-dedicated physical channels. On the other hand, even while communicating with the multiple radio base stations by using SHO on the A-DPCHs, the mobile station communicates only with one of the multiple radio base stations in its active set on the HS-PDSCH and HS-SCCH that are shared channels. Here, the radio base station communicating on the HS-PDSCH and HS-SCCH is generally called an HS serving cell.

In this situation, when the mobile station makes a determination on branch replacement, the mobile station may carry out reporting event 1C for replacing a radio base station used as an HS serving cell in the active set with a radio base station not in the active set. In this case, if the radio control station makes a control for carrying out the branch replacement in accordance with the report from the mobile station, the mobile station is disabled to continue to communicate using the HSDPA, and such disconnection is a problem.

Moreover, when the mobile station makes a determination on branch exclusion, the mobile station may carry out reporting event 1B for excluding a radio base station used as an HS serving cell in the active set. In this case, if the radio control station makes a control for carrying out the branch exclusion in accordance with the report from the mobile station, the mobile station is disabled to continue to communicate using the HSDPA, and such disconnection is also a problem.

In this way, when a mobile station simultaneously communicates with multiple radio base stations by using SHO on A-DPCHs that are associated-dedicated physical channels, while communicating only with one of the radio base stations used as an HS serving cell in its active set on an HS-SCCH and HS-PDSCH that are shared channels, the branch replacement or branch exclusion may disconnect a radio link to the radio base station used as the HS serving cell. This disconnection hinders the mobile station from continuing to communicate by using the HSDPA with a radio base station used as an HS serving cell, thereby causing a problem.

In consideration of the aforementioned problems, an object of the present invention is to provide a mobile station and a handover control method for preventing a radio link to a radio base station used as an HS serving cell from being disconnected when a determination is made on branch replacement or branch exclusion, thereby achieving more stable HSDPA communications.

A first aspect of the present invention for achieving the foregoing object is a mobile station in a mobile communication system including multiple radio base stations and a radio control station connected to the multiple radio base stations, the mobile station including a controller having the following feature. When the mobile station simultaneously communicates with the multiple radio base stations by using a first communication channel and communicates only with a certain one of the multiple radio base stations by using a second communication channel, and even when the radio quality of the certain radio base station communicating with the second communication channel becomes deteriorated, the controller maintains communications with the certain radio base station communicating with the second communication channel.

The mobile station according to the first aspect can achieve more stable HSDPA communications while preventing a radio link to a radio base station of an HS serving cell from being disconnected in the case of making a determination on branch replacement or branch exclusion.

In addition, the mobile station of the first aspect may further include a notification unit. When there is a radio base station having better radio quality than the multiple radio base stations, the notification unit notifies the radio control station of an exclusion of communications with one of the multiple radio base stations excluding the radio base station communicating with the second communication channel, and of an addition of communications with the radio base station having better radio quality than the multiple radio base stations.

Moreover, when there is a radio base station which is other than the multiple radio base stations, and which has better radio quality than the multiple radio base stations excluding the one communicating with the second communication channel, the notification unit may notify the radio control station of an exclusion of communications with one of the multiple radio base stations other than the one communicating with the second communication channel, and an addition of communications with the radio base station having better radio quality than the multiple radio base stations.

A second aspect of the present invention is a mobile station in a mobile communication system including multiple radio base stations and a radio control station connected to the multiple radio base stations, the mobile station including a notification unit having the following feature. When the mobile station simultaneously communicates with the multiple radio base stations by using first communication channels and communicates only with a certain one of the radio base stations by using a second communication channel, when there is a radio base station having better radio quality than the multiple radio base stations, and when the radio quality of the multiple radio base stations other than the certain radio base station communicating with the second communication channel is better than that of the certain radio base station communicating with the second communication channel, the notification unit preferentially carries out the processing of notifying the radio control station of the radio base station having the best radio quality among the multiple radio base stations, prior to the processing of notifying the radio control station of an exclusion of communications with the radio base stations having the poorest radio quality among the multiple radio base stations, and an addition of communications with the radio base station having better radio quality than the multiple radio base stations.

The mobile station according to the second aspect can achieve more stable HSDPA communications while preventing a radio link to a radio base station of an HS serving cell from being disconnected in the case of making a determination on branch replacement or branch exclusion.

In the mobile station according to any of the first and second aspects, the first communication channel may be an associated-dedicated physical channel A-DPCH, and the second communication channel may be an HS-PDSCH or HS-SCCH.

Furthermore, as for the mobile station according to any of the first and second aspects, the mobile communication system may be the one employing HSDPA for downlink.

A third aspect of the present invention is a handover control method used in a mobile communication system including a mobile station, multiple radio base stations making radio communications with the mobile station, and a radio control station connected to the multiple radio base stations, the method including the following communication maintaining step. Specifically, when the mobile station simultaneously communicates with the multiple radio base stations by using a first channel and communicates only with a certain one of the multiple radio base stations by using a second communication channel, and even when the radio quality of the certain radio base station communicating with the second communication channel becomes deteriorated, communications with the certain radio base station are maintained.

Use of the handover control method according to the third aspect leads to more stable HSDPA communications while preventing a radio link to a radio base station of an HS serving cell from being disconnected in the case of making a determination on branch replacement or branch exclusion.

According to these aspects of the present invention, it is possible to provide a mobile station and a handover control method capable of preventing a radio link to a radio base station of an HS serving cell from being disconnected in the case of making a determination for branch replacement or branch exclusion, thereby achieving more stable HSDPA communications.

DESCRIPTION OF THE PREFERRED EMBODIMENTS

Figure 1:
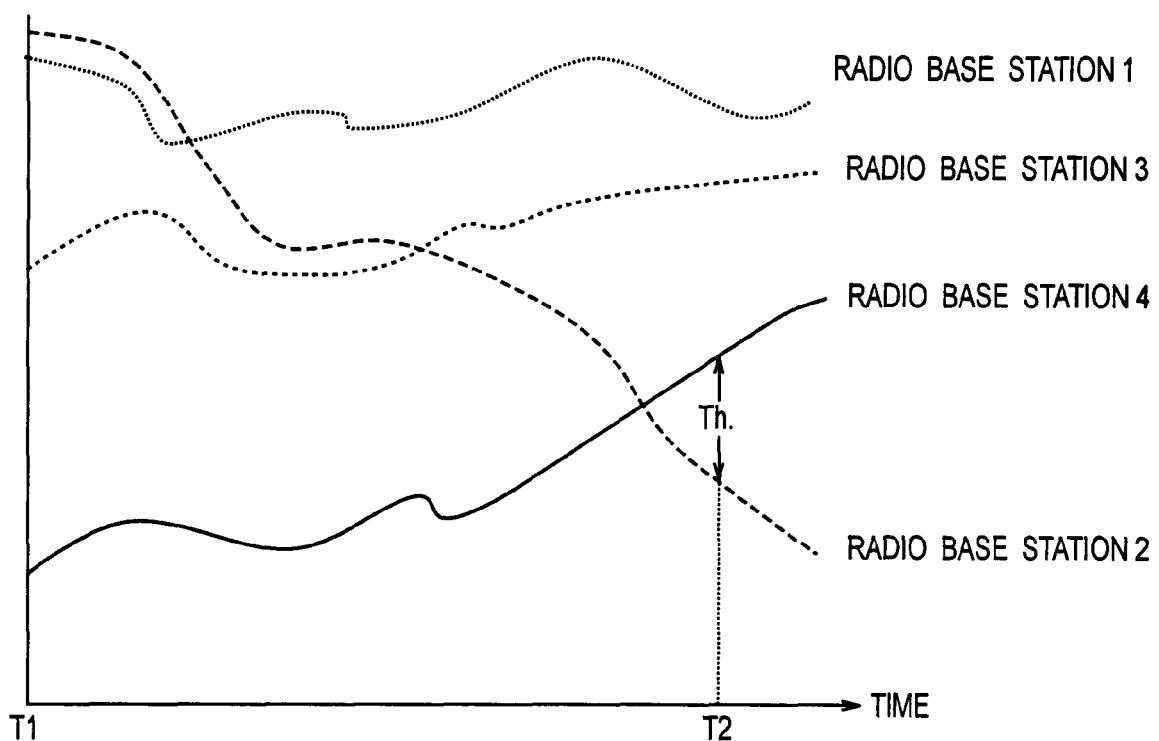
FIG. 1 is a diagram showing an example of transitions of CPICH RSCPs of conventional radio base stations.

Hereinafter, an embodiment of the present invention will be described with reference to the drawings. In the following descriptions of the drawings, the same or similar reference numerals are given to the same or similar components. In addition, it should be noted that the drawings are just schematic ones.

(Configuration of Mobile Communication System)

A mobile communication system according to this embodiment includes mobile stations 11 to 13, a plurality of radio base stations 21 to 25 making radio communications with the mobile stations 11 to 13, and a radio control station 30 connected to the radio base stations 21 to 25 and controlling the radio base stations 21 to 25. Incidentally, although one radio base station is configured to have one sector in FIG. 2, one radio base station may be configured to have multiple sectors. In this case, a radio link for communicating by using SHO is set for each sector.

Figure 2:
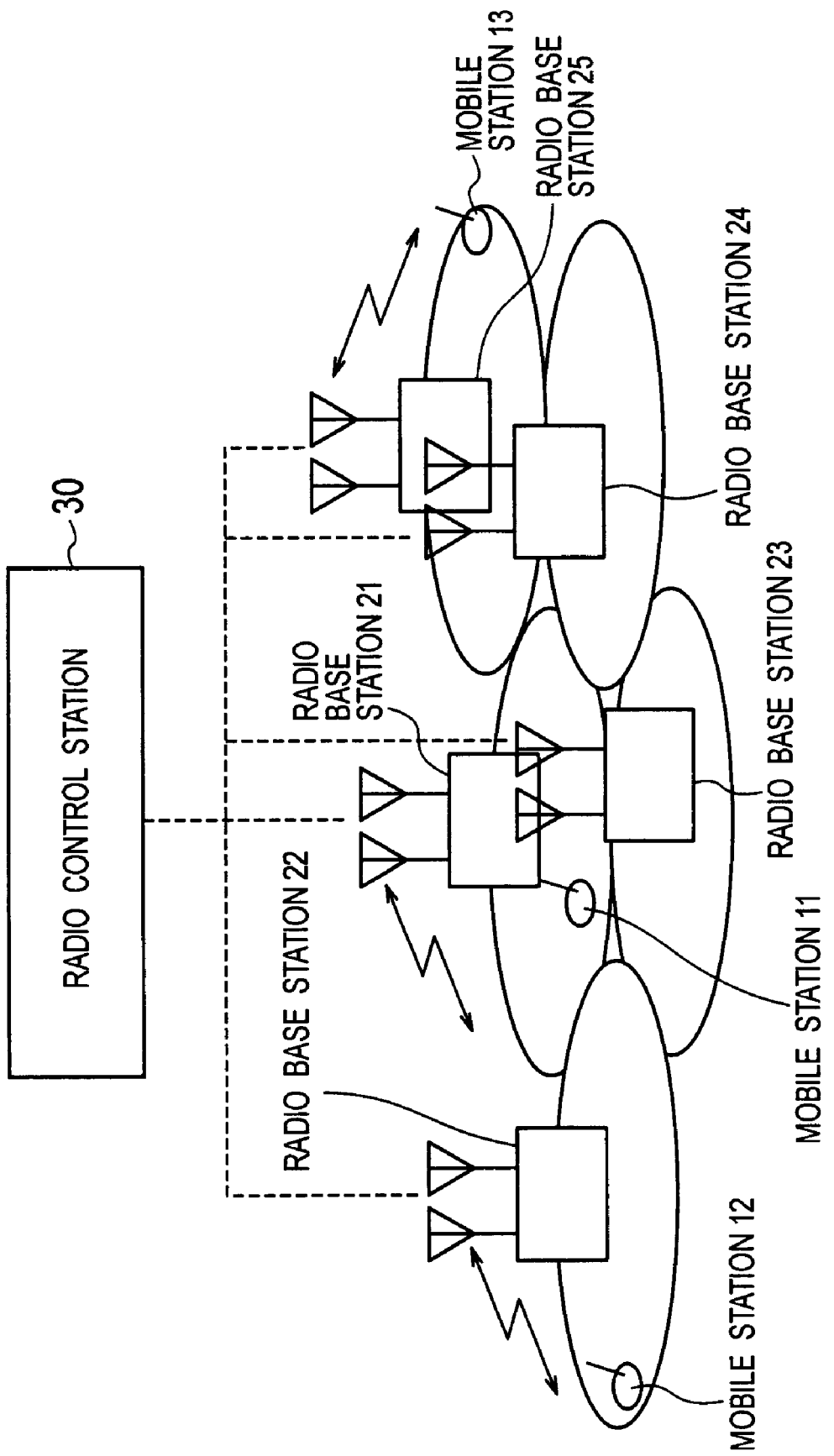
FIG. 2 is an entire configuration diagram of a mobile communication system according to an embodiment.

FIG. 2 shows a case where HSDPA is applied to downlink of the mobile communication system.

Here, the description is given for communication channels in HSDPA. In downlink of HSDPA, used are a high speed-physical downlink shared channel (HS-PDSCH), a high speed-shared control channel (HS-SCCH), and a downlink associated-dedicated physical channel (A-DPCH). More precisely, the HS-PDSCH and HS-SCCH are used and shared by multiple mobile stations, while the A-DPCH is allocated to each mobile station individually and is associated with the HS-PDSCH.

On the other hand, in uplink, besides an uplink associated-dedicated physical channel (A-DPCH) individually allocated to each mobile station, used is a high speed-dedicated physical control channel (HS-DPCCH) which is a control channel for HSDPA, and which is allocated to each mobile station individually.

Moreover, in downlink, a transmission power control command for the uplink associated-dedicated physical channel and the like are transmitted on the downlink associated-dedicated physical channel, and user data is transmitted on the HS-PDSCH. On the other hand, in uplink, besides user data, a pilot symbol and a transmission power control command (TPC command) for the downlink associated-dedicated physical channel are transmitted on the uplink associated-dedicated physical channel. In addition, downlink quality information (Channel quality indicator) used for scheduling of shared channels and an adaptive modulation and coding scheme (AMCS), and acknowledgment information of the downlink shared channel HS-DSCH are transmitted on the HS-PDCCH.

Figure 3:
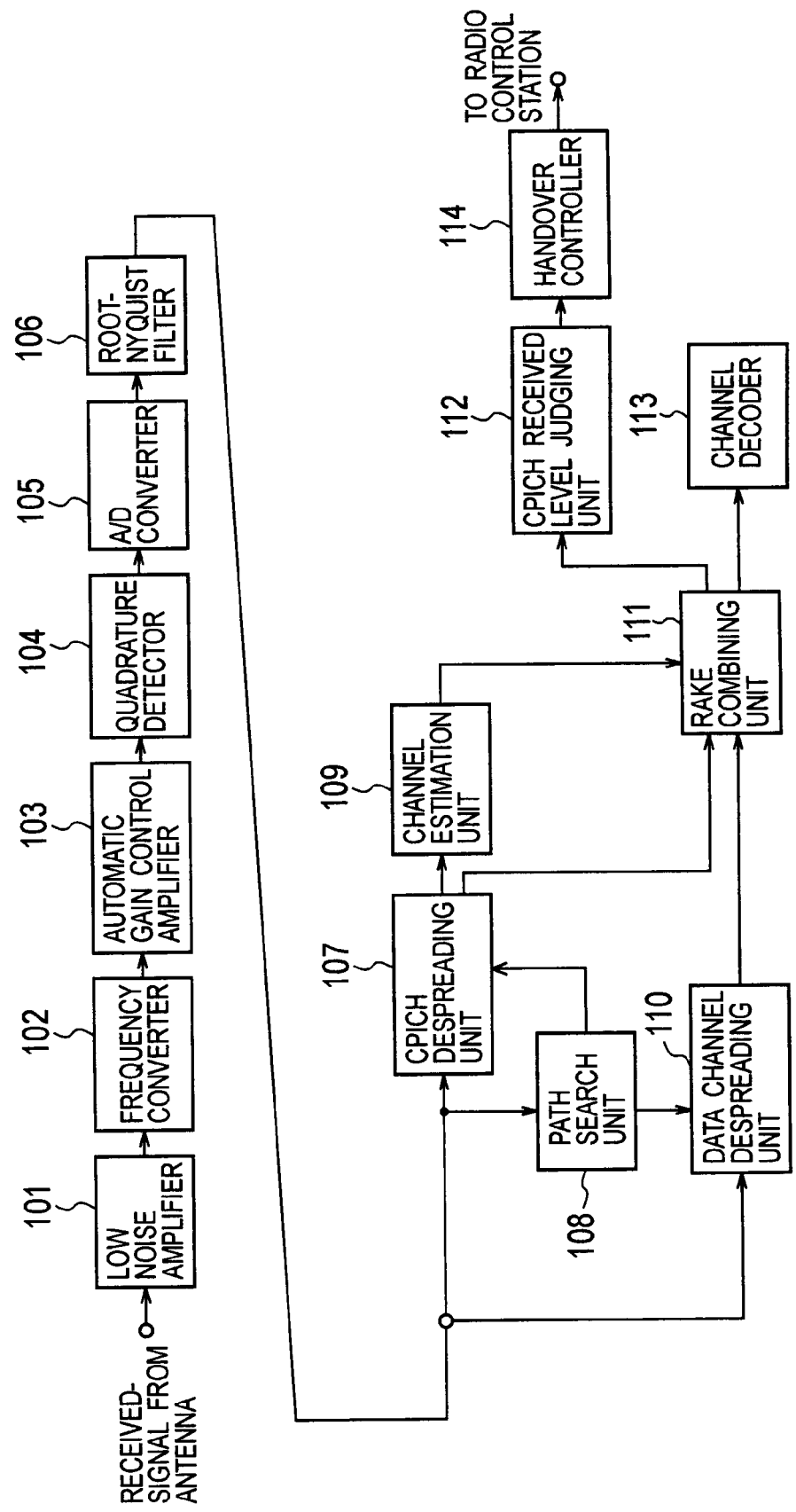
FIG. 3 is a functional block diagram of a mobile station according to this embodiment.

Subsequently, the mobile stations 11 to 13 according to this embodiment will be described by using FIG. 3. FIG. 3 only shows several functions of a mobile station according to this embodiment of the present invention, and does not include the other functions. Each of the mobile stations 11 to 13 includes a low noise amplifier 101, a frequency converter 102, an automatic gain control amplifier 103, a quadrature detector 104, an A/D converter 105, a root-Nyquist filter 106, a CPICH despreading unit 107, a path search unit 108, a channel estimation unit 109, a data channel despreading unit 110, a RAKE combining unit 111, a CPICH received level judging unit 112, a channel decoder 113, and a handover controller 114.

The low noise amplifier 101 amplifies a downlink received signal inputted to the mobile station. The frequency converter 102 converts the frequency of the amplified received signal into an inter-frequency. The automatic gain control amplifier 103 linearly amplifies the received signal after the frequency conversion. The quadrature detector 104 makes a quadrature detection on the signal thus amplified, thereby decomposing the signal into in-phase and quadrature components. The A/D converter 105 converts the analog signals of the in-phase and quadrature components into digital signals. The root-Nyquist filter 106 limits the bands of the digitalized in-phase and quadrature components.

The CPICH despreading unit 107 despreads the bandlimited signal sequences of a CPICH that is a common pilot channel. Here, the CPICH despreading unit 107 despreads the signal sequences for each of paths searched out by the path search unit 108 and having different propagation delay times. Thereafter, the despread signal sequences of the CPICH are transmitted to the channel estimation unit 109.

The channel estimation unit 109 performs a channel estimation for the despread signal sequences of the CPICH.

The RAKE combining unit 111 performs RAKE combining of the despread signal sequences of the CPICH for each of the paths having the different propagation delay times. Thereafter, the RAKE-combined signal sequence of the CPICH is transmitted to the CPICH received level judging unit 112. Although this example shows a case where the RAKE-combined signal sequence of the CPICH is transmitted to the CPICH received level judging unit 112, the signal sequence of the CPICH before the RAKE combining may be transmitted to the CPICH received level judging unit 112.

Note that the aforementioned CPICH receiving processing is performed for a CPICH from a predetermined radio base station in the mobile communication system. In the following example, the CPICH receiving processing is performed for the CPICHs from the radio base stations 21 to 25. In this case, to the CPICH received level judging unit 112, the RAKE combining unit 111 transmits RAKE-combined signal sequences of CPICHs corresponding to the radio base stations 21 to 25.

On the other hand, the data channel despreading unit 110 despreads the bandlimited signal sequences for a data channel, and thereby generates the despread signal sequences for the data channel. Here, the data channel despreading unit 110 despreads the signal sequences for each of paths searched out by the path search unit 108 and having different propagation delay times. Then, the RAKE combining unit 111 performs the RAKE combining of the despread signal sequences for the data channel for each of the paths having the different propagation delay times. Then, the RAKE-combined signal sequence of the data channel is transmitted to the channel decoder 113.

The channel decoder 113 performs channel decoding of the RAKE-combined signal sequence of the data channel. Incidentally, in terms of HSDPA, the data channel is a shared control channel HS-SCCH, a shared data channel HS-PDSCH, and a dedicated channel A-DPCH associated with the shared channel, for example.

The CPICH received level judging unit 112 receives the RAKE-combined signal sequences of the CPICHs corresponding to the radio base stations 21 to 25 from the RAKE combining unit 111, and computes the CPICH RSCPs of the radio base stations 21 to 25 by using the RAKE-combined signal sequences of the CPICHs corresponding to the radio base stations 21 to 25. After that, the CPICH received level judging unit 112 transmits the CPICH RSCPs of the radio base stations 21 to 25 to the handover controller 114.

The handover controller 114 (a controller and a notifying unit) receives the CPICH RSCPs of the radio base stations 21 to 25 from the CPICH received level judging unit 112, makes a determination on branch addition, branch exclusion, and branch replacement by using the CPICH RSCPs of the radio base stations 21 to 25, and then notifies the radio control station 30 of the determination result.

Note that, although the determination on branch addition, branch exclusion and branch replacement is made by using the CPICH RSCPs in the above example, it is possible to make the determination by using CPICH Ec/N0 or pathloss instead of using the CPICH RSCPs. Moreover, the handover controller 114 not only makes a determination for branch addition, branch exclusion, and branch replacement in order to perform SHO on an A-DPCH, but also may make a determination on the best cell in order to change cells for the HS serving cell. Incidentally, the reporting of the determination on the best cell is defined as reporting event 1D in the 3GPP TS25.331, V6.10.0.

Hereinafter, by using FIGS. 4 to 7, a description will be provided for an example of a handover control in the handover controller 114 according to this embodiment. Incidentally, in order to simplify the description, a time-to-trigger and cell individual offsets described in the 3GPP TS25.331, V6.10.0 are set to 0 in the description using FIGS. 4 to 6, and the cell individual offsets described in the 3GPP TS25.331, V6.10.0 are set to 0 in the description using FIG. 7. In addition, Th1 in the following description is equivalent to H1c/2 (H1c: the hysteresis parameter for the event 1c) in the 3GPP TS25.331, V6.10.0.

Figure 4:
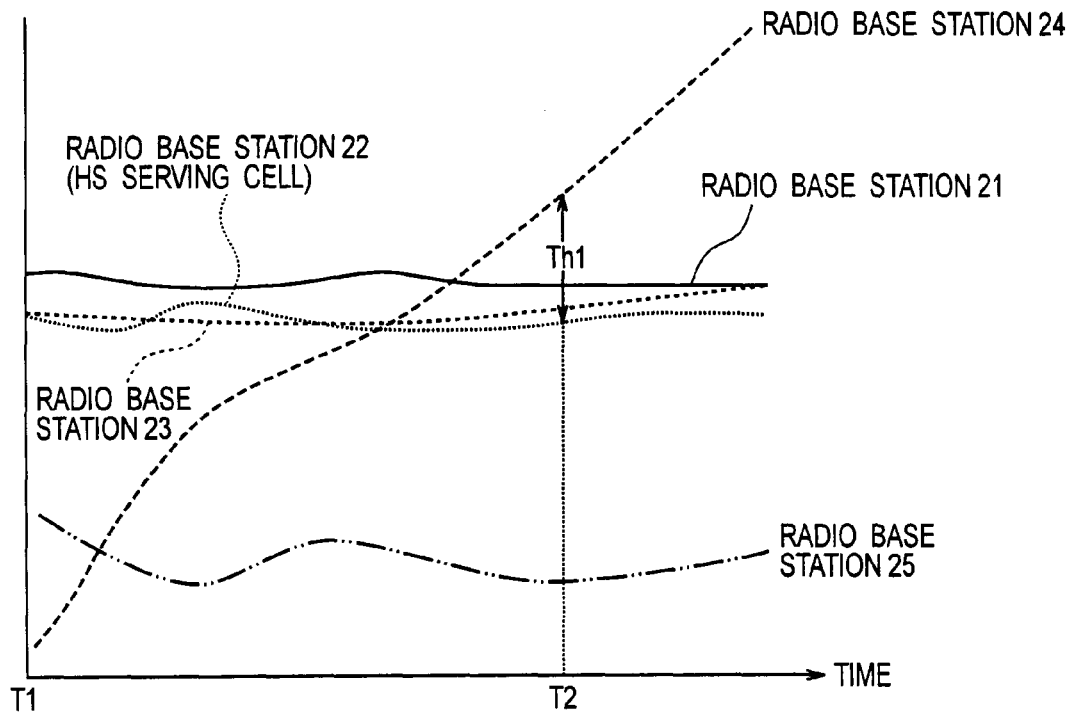
FIG. 4 is a diagram showing an example of transitions of CPICH RSCPs of radio base stations according to this embodiment (No. 1).

FIG. 4 shows an example of transitions of common pilot channels' received signal powers CPICH RSCPs from the radio base stations 21 to 25 in the mobile station 11. Here, assume that the replacement activation threshold is 3. At the time period from T1 to T2, the mobile station 11 communicates by using SHO with the radio base stations 21 to 23 on the associated-dedicated physical channels A-DPCHs, and communicates with the radio base station 22 on HSDPA channels HS-SCCH and HS-PDSCH. In other words, the radio base station 22 is the HS serving cell. In general, the HS serving cell is a radio base station having the best radio quality in the active set, and accordingly the radio base station 21 should be the HS serving cell under proper conditions. However, since a hysteresis occurs when the best cell is determined in reporting event 1D, a radio base station not having the best radio quality may sometimes serve as the HS serving cell as shown in FIG. 4.

At the time point T2, a value obtained by subtracting the CPICH RSCP of the radio base station 22 having the weakest CPICH RSCP in the active set from the CPICH RSCP of the radio base station 24 exceeds the predetermined threshold Th1, and the radio base station 22 is the HS serving cell. For this reason, at the time point T2, the handover controller 114 determines that the radio base station 23 having the second weakest CPICH RSCP in the active set is to be replaced with the radio base station 24, and reports the determination result to the radio control station 30.

Here, the description that "a value obtained by subtracting the CPICH RSCP of the radio base station 22 having the weakest CPICH RSCP in the active set from the CPICH RSCP of the radio base station 24 exceeds the predetermined threshold Th1" has the same meaning as the description that the following formula is true, for example.

$$CPICH\_RSCP_{24} \geq CPICH\_RSCP_{22} + Th1$$

Here, $CPICH\_RSCP_{24}$ and $CPICH\_RSCP_{22}$ denote the CPICH RSCPs of the radio base stations 24 and 22, respectively.

Note that, in the above example, the mobile station reports one radio base station (the radio base station 24 in the above example) not in the active set and one radio base station (the radio base station 23 in the above example) in the active set, which are to be replaced with each other, but the mobile station may report two or more radio base stations for each of the two categories.

In the above example, at the time T2, the handover controller 114 determines that the radio base station 23 having the second weakest CPICH RSCP in the active set is to be replaced with the radio base station 24, and reports the determination result to the radio control station 30. However, the handover controller 114 may determine that the radio base station 23 having the second weakest CPICH RSCP in the active set is to be replaced with the radio base station 24, and then may determine, in accordance with determination rules as described below, whether or not to report the determination result to the radio control station 30.

For example, when the CPICH RSCP of the radio base station 23 having the second weakest CPICH RSCP in the active set is smaller than the CPICH RSCP of the radio base station 24, the handover controller 114 may determine that the radio base station 23 having the second weakest CPICH RSCP in the active set is to be replaced with the radio base station 24, and report the determination result to the radio control station 30. On the other hand, when the CPICH RSCP of the radio base station 23 having the second weakest CPICH RSCP in the active set is not smaller than the CPICH RSCP of the radio base station 24, the handover controller 114 may determine to report nothing to the radio control station 30.

Alternatively, for example, when the CPICH RSCP of the radio base station 23 having the second weakest CPICH RSCP in the active set is included in "cell measurement event results" described in the 3GPP TS25.331, V6.10.0, the handover controller 114 may determine that the radio base station 23 having the second weakest CPICH RSCP in the active set is to be replaced with the radio base station 24, and report the determination result to the radio control station 30. On the other hand, when the CPICH RSCP of the radio base station 23 having the second weakest CPICH RSCP in the active set is not included in the "cell measurement event results" described in the 3GPP TS25.331, V6.10.0, the handover controller 114 may determine to report nothing to the radio control station 30.

Instead, for example, when a value obtained by subtracting the CPICH RSCP of the radio base station 24 from the CPICH RSCP of the radio base station 23 having the second weakest CPICH RSCP is smaller than a predetermined threshold, the handover controller 114 may determine that the radio base station 23 having the second weakest CPICH RSCP in the active set is to be replaced with the radio base station 24, and report the determination result to the radio control station 30. On the other hand, when the value obtained by subtracting the CPICH RSCP of the radio base station 24 from the CPICH RSCP of the radio base station 23 having the second weakest CPICH RSCP exceeds the predetermined threshold, the handover controller 114 may determine to report nothing to the radio control station 30.

Hereinafter, a description will be provided for another example of the handover control in the handover controller 114 according to this embodiment.

Figure 5:
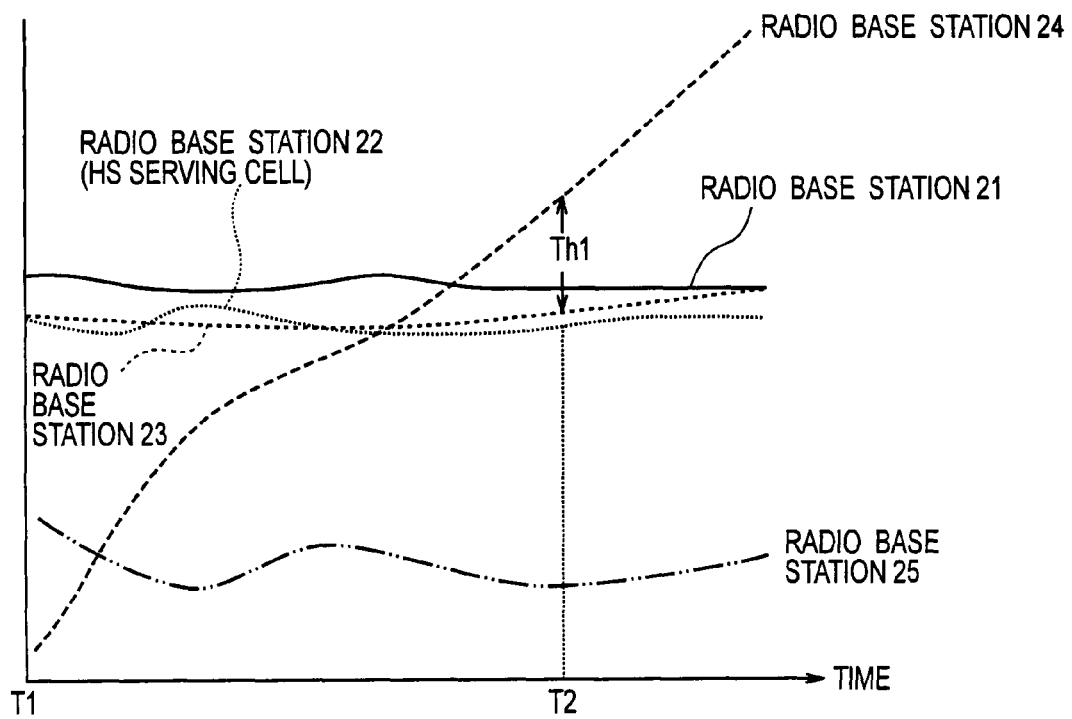
FIG. 5 is a diagram showing an example of transitions of CPICH RSCPs of radio base stations according to this embodiment (No. 2).

FIG. 5 shows an example of transitions of common pilot channels' received signal powers CPICH RSCPs from the radio base stations 21 to 25 in the mobile station 11. Here, assume that the replacement activation threshold is 3. At the time period from T1 to T2, the mobile station 11 communicates by using SHO with the radio base stations 21 to 23 on the associated-dedicated physical channels A-DPCHs, and communicates with the radio base station 22 on HSDPA channels HS-SCCH and HS-PDSCH. In other words, the radio base station 22 is the HS serving cell. In general, the HS serving cell is a radio base station having the best radio quality in the active set, and accordingly the radio base station 21 is to be the HS serving cell under proper conditions. However, since a hysteresis occurs when the best cell is determined in reporting event 1D, a radio base station not having the best radio quality may sometimes serve as the HS serving cell as shown in FIG. 5.

At the time point T2, a value obtained by subtracting the CPICH RSCP of the radio base station 23 from the CPICH RSCP of the radio base station 24 exceeds the predetermined threshold Th1. Here, the radio base station 23 has the weakest CPICH RSCP in the active set, and is not the HS serving cell. For this reason, at the time point T2, the handover controller 114 determines that the radio base station 23 in the active set is to be replaced with the radio base station 24, and reports the determination result to the radio control station 30.

Here, the description that "a value obtained by subtracting the CPICH RSCP of the radio base station 23 from the CPICH RSCP of the radio base station 24 exceeds the predetermined threshold Th1" has the same meaning as the description that the following formula is true, for example.

$$CPICH\_RSCP_{24} \geq CPICH\_RSCP_{23} + Th1$$

Here, CPICH_RSCP$_{24}$ and CPICH_RSCP$_{23}$ denote the CPICH RSCPs of the radio base stations 24 and 23, respectively.

Incidentally, Th1 in the above description is equivalent to H1c/2 (H1c: the hysteresis parameter for the event 1c) in the 3GPP TS25.331, V6.10.0. Moreover, in the above example, the mobile station reports one radio base station (the radio base station 24 in the above example) not in the active set and one radio base station (the radio base station 23 in the above example) in the active set, which are to be replaced with each other, but the mobile station may report two or more radio base stations for each of the two categories.

Still another example of the handover control in the handover controller 114 according to this embodiment will be described below.

Figure 6:
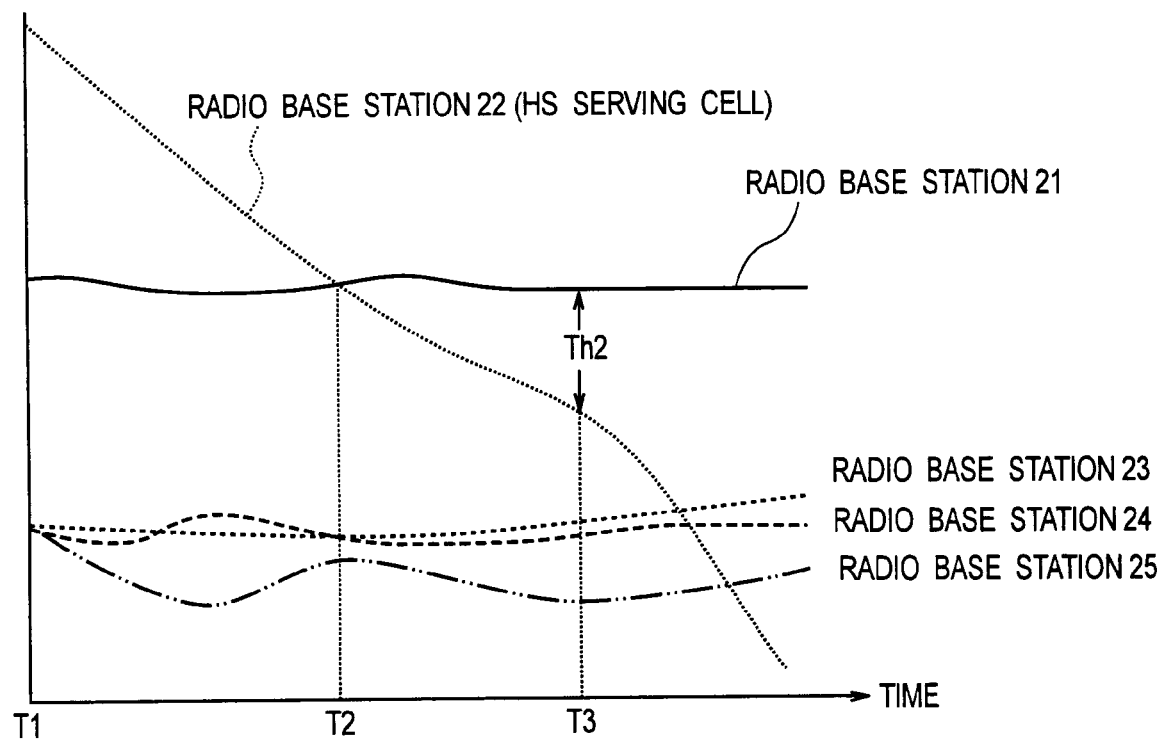
FIG. 6 is a diagram showing an example of transitions of CPICH RSCPs of radio base stations according to this embodiment (No. 3).

FIG. 6 shows an example of transitions of common pilot channels' received signal powers CPICH RSCPs from the radio base stations 21 to 25 in the mobile station 11. At the time period from T1 to T3, the mobile station 11 communicates by using SHO with the radio base stations 21 and 22 on the associated-dedicated physical channels A-DPCHs, and communicates with the radio base station 22 on HSDPA channels HS-SCCH and HS-PDSCH. In other words, the radio base station 22 is the HS serving cell. The radio base stations 23 to 25 are not included in the action set, because they have deteriorated radio quality. In general, the HS serving cell is a radio base station having the best radio quality in the active set, and accordingly the radio base station 21 should be the HS serving cell at the time period from T2 to T3. However, since a hysteresis occurs when the best cell is determined in reporting event 1D, a radio base station not having the best radio quality may sometimes serve as the HS serving cell as shown in FIG. 6.

Even though a value obtained by subtracting the CPICH RSCP of the radio base station 22 from the CPICH RSCP of the radio base station 21 having the best radio quality exceeds a predetermined threshold Th2 at the time point T3, the handover controller 114 may determine that the radio base station 22 used as the HS serving cell is not excluded from and thus maintained in the active set. In other words, the handover controller 114 does not notify the radio control station 30 of the determination result for branch exclusion in regard to the radio base station 22 used as the HS serving cell.

Alternatively, when the value obtained by subtracting the CPICH RSCP of the radio base station 22 from the CPICH RSCP of the radio base station 21 having the best radio quality exceeds the predetermined threshold Th2 at the time point T3, the handover controller 114 may carry out reporting event 1D for reporting the radio base station 21 having the best radio quality as the best cell.

Yet another example of the handover control in the handover controller 114 according to this embodiment will be described below. Note that, in the following description, the cell individual offsets described in the 3GPP TS25.331, V6.10.0 are set to 0, but a hysteresis and a time-to-trigger are set to values other than 0. In the following description, Th1 is equivalent to H1c/2 (H1c: the hysteresis parameter for the event 1c) in the 3GPP TS25.331, V6.10.0, and Th3 is equivalent to H1d/2 (H1d: the hysteresis parameter for the event 1d) in the 3GPP TS25.331, V6.10.0. In addition, TTTc denotes a time-to-trigger for a report for branch replacement, that is, the reporting event 1C, and TTTd denotes a time-to-trigger for a report of a determination related to the best cell, that is, the reporting event 1D.

Figure 7:
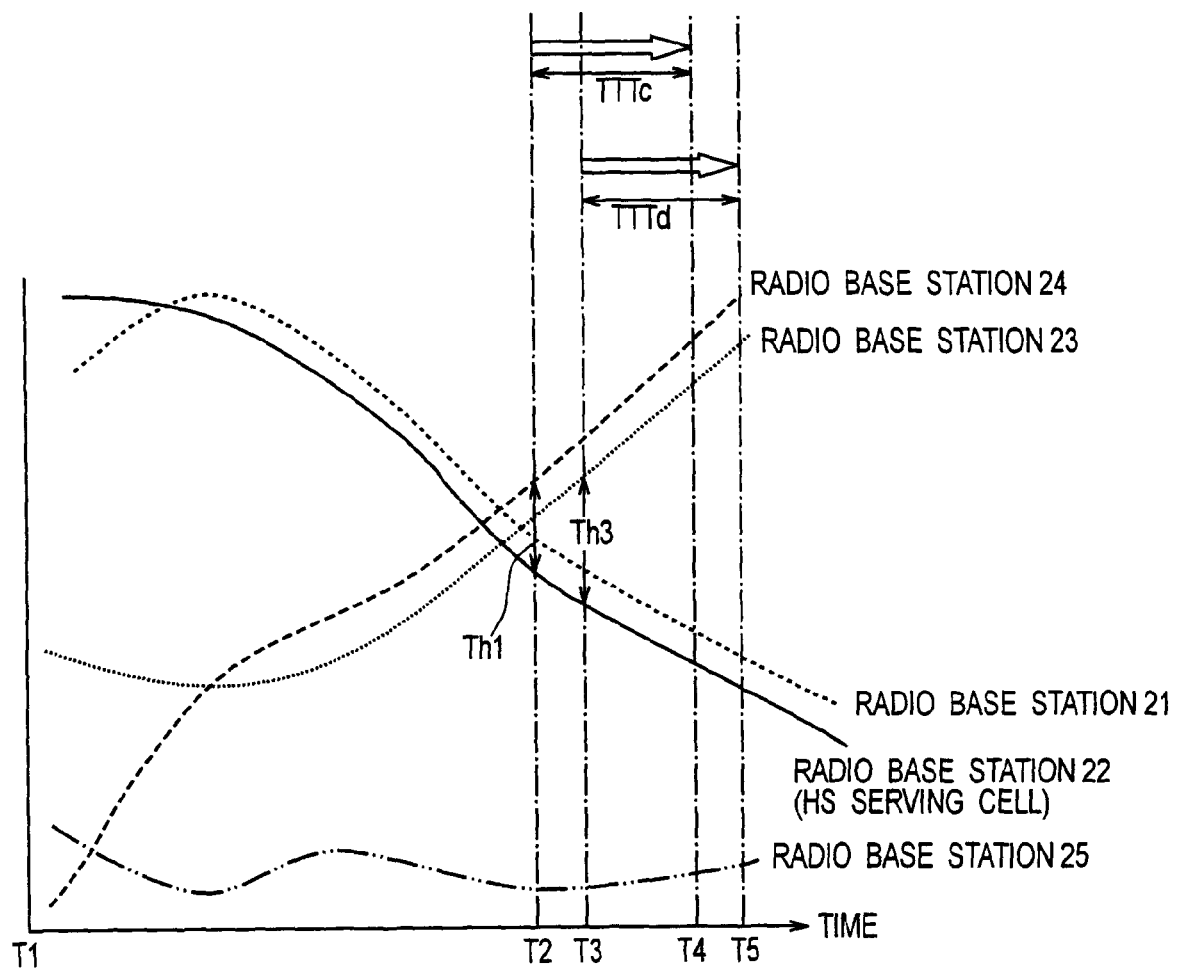
FIG. 7 is a diagram showing an example of transitions of CPICH RSCPs of radio base stations according to this embodiment (No. 4).

FIG. 7 shows an example of transitions of common pilot channels' received signal powers CPICH RSCPs from the radio base stations 21 to 25 in the mobile station 11. Here, assume that the replacement activation threshold is 3. At the time period from T1 to T2, the mobile station 11 communicates by using SHO with the radio base stations 21 to 23 on the associated-dedicated physical channels A-DPCHs, and communicates with the radio base station 22 on HSDPA channels HS-SCCH and HS-PDSCH. In other words, the radio base station 22 is the HS serving cell. In general, the HS serving cell is a radio base station having the best radio quality in the active set, and accordingly the radio base station 21 is to be the HS serving cell under proper conditions. However, since a hysteresis occurs when the best cell is determined in reporting event 1D, a radio base station not having the best radio quality may sometimes serve as the HS serving cell as shown in FIG. 7.

At the time point T2, the handover controller 114 determines that a value obtained by subtracting the CPICH RSCP of the radio base station 22 having the weakest CPICH RSCP in the active set from the CPICH RSCP of the radio base station 24 exceeds the predetermined threshold Th1. Then, the handover controller 114 starts the time-to-trigger TTTc for branch replacement in which a radio base station in the active set is replaced with the radio base station 24 not in the active set.

Next, at the time T3, the handover controller 114 determines that a value obtained by subtracting the CPICH RSCP of the radio base station 22 being the best cell (HS Serving cell) in the active set from the CPICH RSCP of the radio base station 23 in the active set exceeds the predetermined threshold Th3. Then, the handover controller 114 starts the time-to-trigger TTTd for reporting that the radio base station 23 is the best cell in the active set. At the time T3, the CPICH RSCP value of the radio base station 22 is not the largest among the radio base stations in the active set. However, if a value obtained by subtracting the CPICH RSCP of the radio base station 22 from the CPICH RSCP of one of radio base stations in the active set other than the radio base station 22 is equal to or less than the threshold Th3, the radio base station 22 is the best cell.

After that, when the time-to-trigger TTTc expires at the time T4, the radio base station to be replaced in the active set in the branch replacement is the radio base station 22 used as the HS serving cell, and the time-to-trigger TTTd for reporting that the radio base station 23 is the best cell in the active set is active. Accordingly, the handover controller 114 may not report the determination result on branch replacement in which the radio base station 22 in the active set is replaced with the radio base station 24 not in the active set.

Here, if the radio base station to be replaced in the active set in the branch replacement is not the HS serving cell at the time T4, the handover controller 114 may report, to the radio control station 30 as usual, the determination result on branch replacement in which a radio base station in the active set is replaced with the radio base station 24 not in the active set.

Thereafter, since the time-to-trigger TTTd expires at the time T5, the handover controller 114 reports to the radio control station 30 the determination result indicating that the radio base station 23 in the active set is the best cell.

Here, after reporting, to the radio control station 30, the determination result indicating that the radio base station 23 in the active set is the best cell at the time T5, the handover controller 114 may report the determination result on branch replacement in which the radio base station in the active set is replaced with the radio base station 24 not in the active set, the determination result not having been reported at the time T4. Alternatively, the handover controller 114 may abandon the determination result on branch replacement in which the radio base station in the active set is replaced with the radio base station 24 not included it the active set.

Moreover, the above example shows a case where a timing (T2) of starting the time-to-trigger for the reporting event 1C is different from a timing (T3) of stating the time-to-trigger for the reporting event 1D, but these timings may be simultaneous. In addition, the above example shows a case where a timing (T4) of the time-to-trigger expiration for the reporting event 1C is different from a timing (T5) of the time-to-trigger expiration for the reporting event 1D, but these timings may be simultaneous. In any case, the processing of reporting event 1D comes before the processing of reporting event 1C.

In addition, in the above example, the handover controller 114 determines at the time T2 that a value obtained by subtracting the CPICH RSCP of the radio base station 22 having the weakest CPICH RSCP in the active set from the CPICH RSCP of the radio base station 24 exceeds the predetermined threshold Th1. However, the radio base station having the weakest CPICH RSCP in the active set is not necessarily the radio base station 22 used as the HS serving cell, and may be a radio base station having the weakest CPICH RSCP other than the HS serving cell.

(Handover Control Method)

Hereinafter, a handover control method for the mobile station according to this embodiment will be described by using flowcharts shown in FIGS. 8 to 12. Incidentally, in order to simplify the description, a time-to-trigger value and cell individual offsets described in the 3GPP TS25.331, V6.10.0 are set to 0 in the description using FIGS. 8 to 11, and cell individual offsets described in the 3GPP TS25.331, V6.10.0 are set to 0 in the description using FIG. 12. In addition, Th1 in the following description is equivalent to H1c/2 (H1c: the hysteresis parameter for the event 1c) in the 3GPP TS25.331, V6.10.0.

Figure 8:
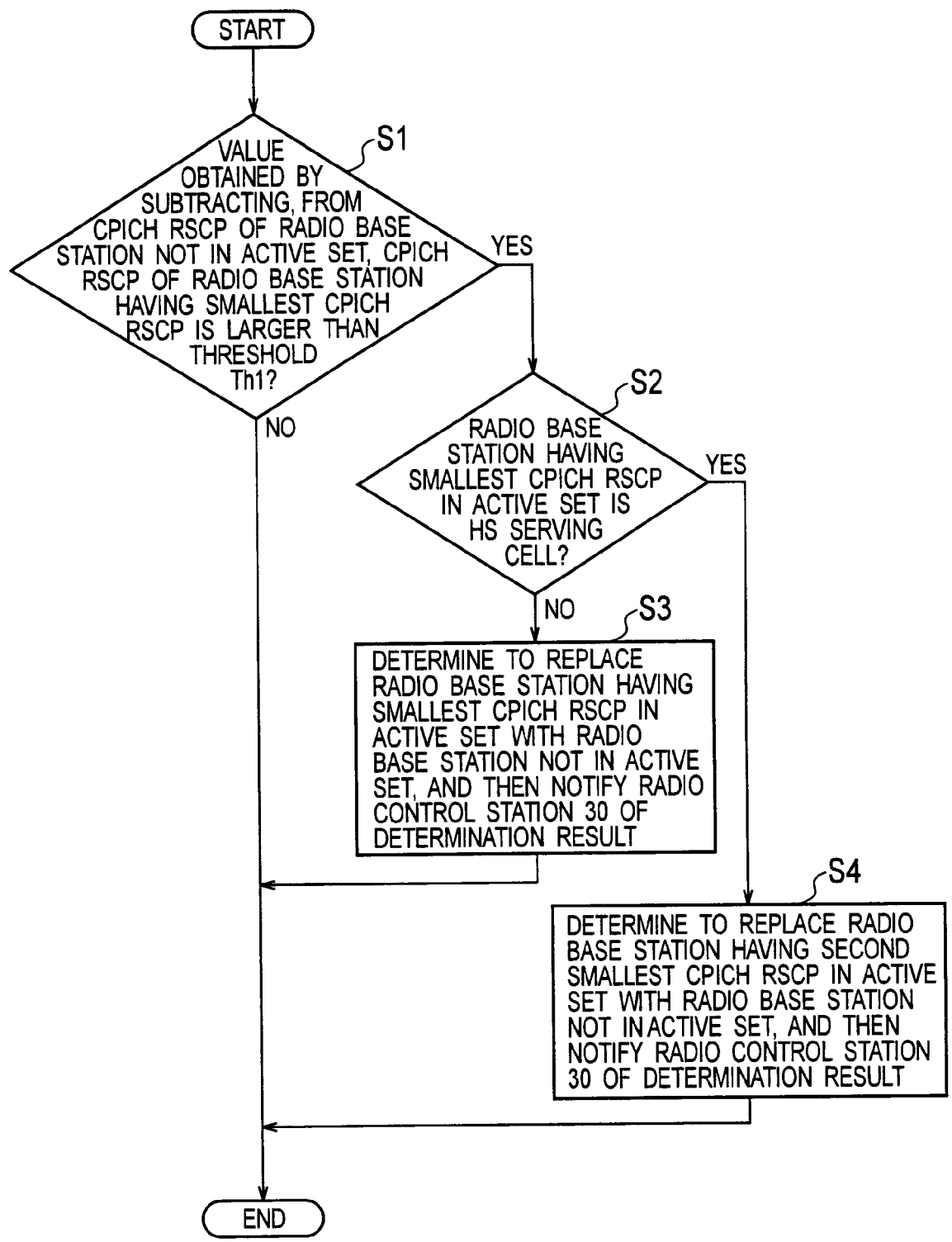
FIG. 8 is a flowchart showing a handover control method according to this embodiment (No. 1).

By referring to FIG. 8, in step S1, a determination is made as to whether the value obtained by subtracting the CPICH RSCP of the radio base station having the weakest CPICH RSCP in the active set from the CPICH RSCP of a radio base station not in the active set is greater than the threshold Th1. When the value obtained by subtracting the CPICH RSCP of the radio base station having the weakest CPICH RSCP in the active set from the CPICH RSCP of a radio base station not in the active set is greater than the threshold Th1, the processing moves to step S2. On the other hand, when the value obtained by subtracting the CPICH RSCP of the radio base station having the weakest CPICH RSCP in the active set from the CPICH RSCP of a radio base station not in the active set is not greater than the threshold Th1, the processing is terminated (moves to end).

Next, in step S2, a determination is made as to whether or not the radio base station having the weakest CPICH RSCP in the active set is the HS serving cell. When the radio base station having the weakest CPICH RSCP in the active set is the HS serving cell, the processing moves to step S4. On the other hand, when the radio base station having the weakest CPICH RSCP in the active set is not the HS serving cell, the processing moves to step S3.

In step S3, it is determined that the radio base station having the weakest CPICH RSCP in the active set is to be replaced with the radio base station not in the active set, and the determination result is reported to the radio control station 30.

Instead, in step S4, it is determined that the radio base station having the second weakest CPICH RSCP in the active set is to be replaced with the radio base station not in the active set, and the determination result is reported to the radio control station 30.

Note that the above processing in steps S1 to S4 is performed for all the radio base stations not in the active set but monitored by the mobile station. In addition, in the aforementioned example, two or more radio base stations may be reported to the radio control station 30 for each of the two categories of a radio base station not in the active set and a radio base station in the active set which are to be replaced with each other.

Figure 9:
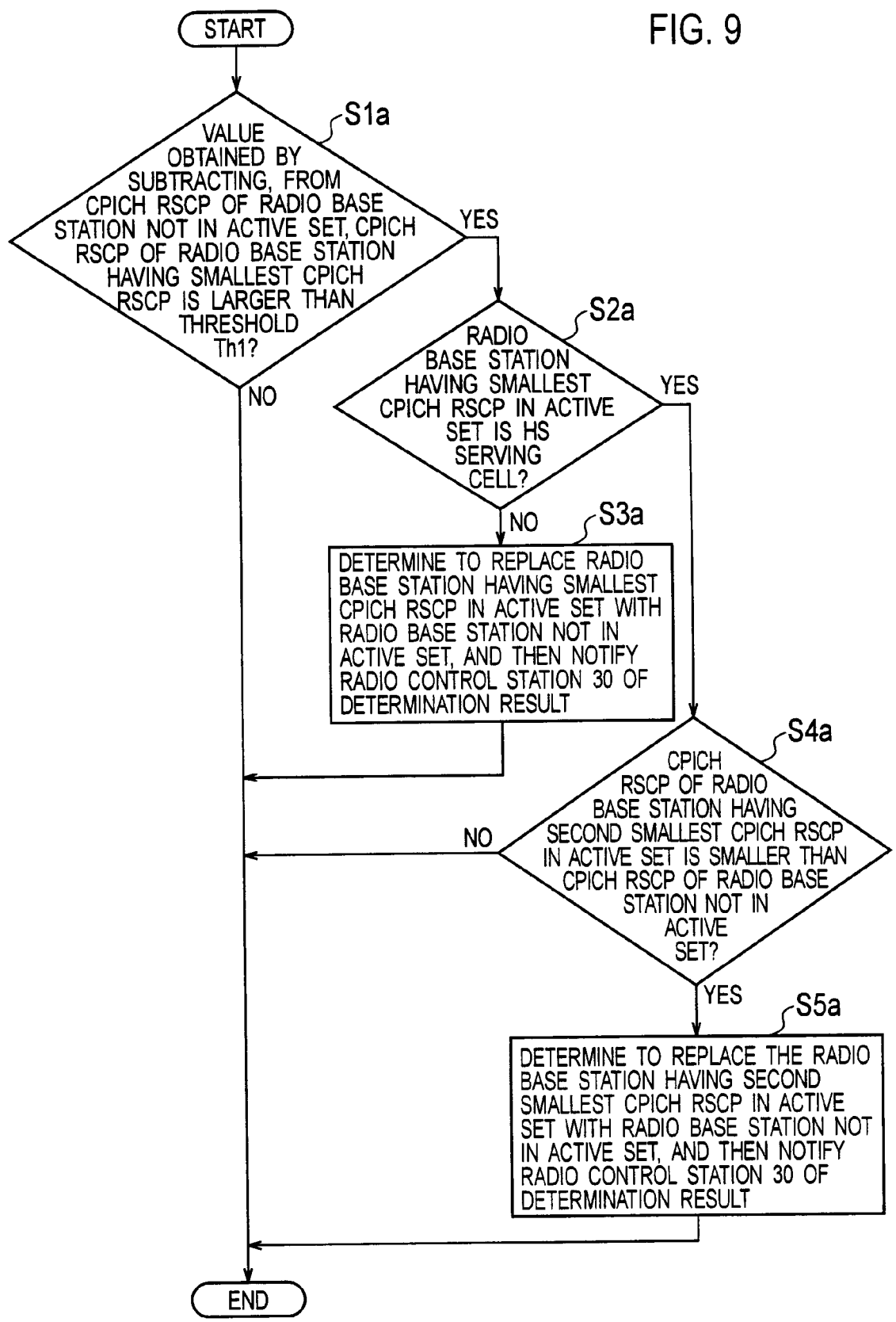
FIG. 9 is a flowchart showing a handover control method according to this embodiment (No. 2).

Moreover, a handover control method shown in FIG. 9 may be carried out as a modification of the above processing in steps S1 to S4.

Since steps S1a to S3a in FIG. 9 are the same as steps S1 to S3 in FIG. 8, the description is omitted here.

In step S4a, a determination is made as to whether or not the CPICH RSCP of the radio base station having the second weakest CPICH RSCP in the active set is smaller than the CPICH RSCP of the radio base station not in the active set. When the CPICH RSCP of the radio base station having the second weakest CPICH RSCP in the active set is smaller than the CPICH RSCP of the radio base station not in the active set, the processing moves to step S5a. On the other hand, when the CPICH RSCP of the radio base station having the second weakest CPICH RSCP in the active set is smaller than the CPICH RSCP of the radio base station not in the active set, the processing is terminated (moves to end).

In the above step S4a, instead of determining whether or not the CPICH RSCP of the radio base station having the second weakest CPICH RSCP in the active set is smaller than the CPICH RSCP of the radio base station not in the active set, a determination may be made as to whether or not the CPICH RSCP of the radio base station having the second weakest CPICH RSCP is included in the "cell measurement event results" described in the 3GPP TS25.331, V6.10.0. In this case, the processing moves to step S5a when the CPICH RSCP of the radio base station having the second weakest CPICH RSCP in the active set is included in the "cell measurement event results" described in the 3GPP TS25.331, V6.10.0, while the processing is terminated (moves to end) when the CPICH RSCP of the radio base station having the second weakest CPICH RSCP in the active set is not in the "cell measurement event results" described in the 3GPP TS25.331, V6.10.0.

Figure 10:
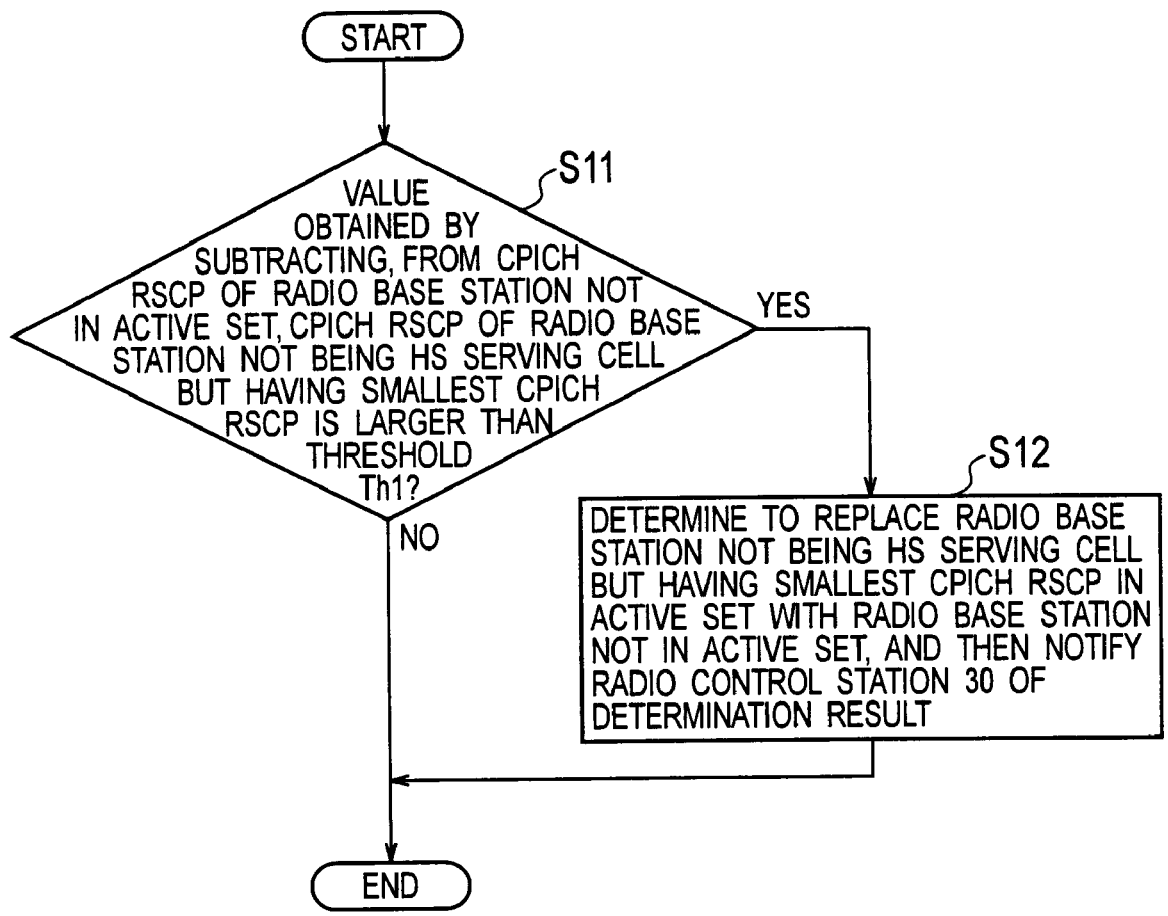
FIG. 10 is a flowchart showing a handover control method according to this embodiment (No. 3).

Hereinafter, another handover control method for the mobile station according to the present invention will be described by using a flowchart shown in FIG. 10.

Firstly, in step S11, a determination is made as to whether or not the below-described value is larger than the threshold Th1. Specifically, the value is obtained by subtracting, from the CPICH RSCP of the radio base station not in the active set, the CPICH RSCP of the radio base station not being the HS serving cell but having the weakest CPICH RSCP in the active set. Then, the processing moves to step S12 when the value thus obtained is larger than the threshold Th1, while the processing is terminated (move to end) when the value thus obtained is not larger than the threshold Th1.

In step S12, it is determined that the radio base station not being the HS serving cell but having the weakest CPICH RSCP in the active set is to be replaced with the radio base station not in the active set. Then, the determination result is reported to the radio control station 30.

Note that the processing in steps S11 and S12 is preformed for all the radio base stations not in the active set but monitored by the mobile station. In addition, in the aforementioned example, two or more radio base stations may be reported to the radio control station 30 for each of the two categories of a radio base station not in the active set and a radio base station in the active set which are to be replaced with each other.

Figure 11:
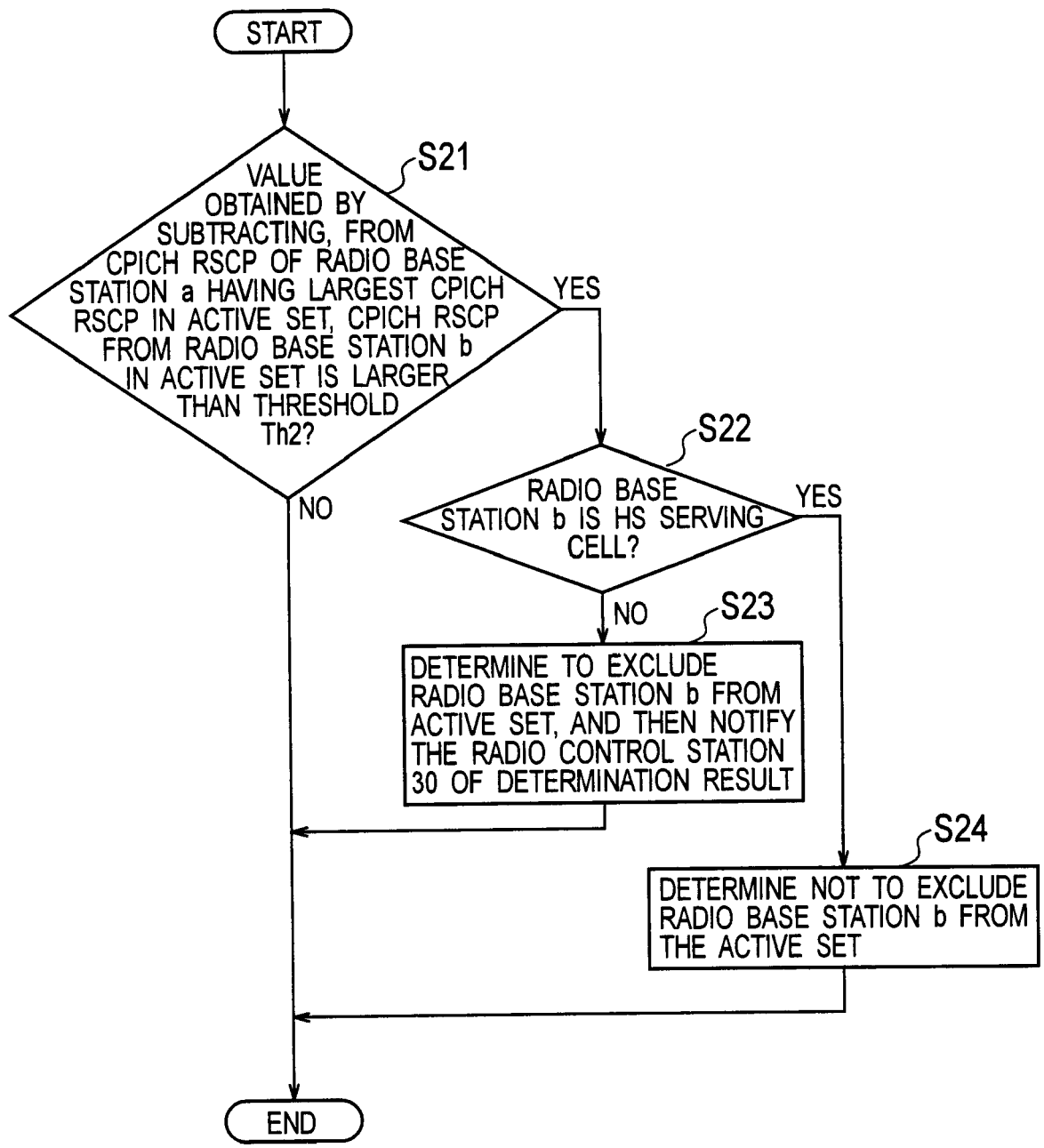
FIG. 11 is a flowchart showing a handover control method according to this embodiment (No. 4).

Still another example of the handover control method for the mobile station according to this embodiment will be described below by using a flowchart shown in FIG. 11.

Firstly, in step S21, a determination is made as to whether a value obtained by subtracting the CPICH RSCP of a radio base station b in the active set from the CPICH RSCP of the radio base station a having the strongest CPICH RSCP in the active set is larger than a predetermined threshold Th2. Then, the processing moves to step 22 when the value obtained by subtracting the CPICH RSCP of the radio base station b in the active set from the CPICH RSCP of the radio base station a having the strongest CPICH RSCP in the active set is larger than the predetermined threshold Th2, while the processing is terminated (moves to end) when the value obtained by subtracting the CPICH RSCP of the radio base station b in the active set from the CPICH RSCP of the radio base station a having the strongest CPICH RSCP in the active set is not larger than the predetermined threshold Th2. Incidentally, the above characters a and b are indices for distinguishing the radio base stations.

In step S22, a determination is made as to whether the radio base station b is the HS serving cell. Then, the processing moves to step S24 when the radio base station b is the HS serving cell, while the processing moves to step S23 when the radio base station b is not the HS serving cell.

In step S23, it is determined to exclude the radio base station b from the active set, and the radio control station 30 is notified of the determination result.

In step S24, it is determined not to exclude the radio base station b from the active set, that is, to maintain the radio base station b therein, and the radio control station 30 is notified of the determination result. Or, the radio control station 30 is not notified of anything. Instead, it is determined that the radio base station b is not excluded from the active set, and that the best cell is the radio base station a having the strongest CPICH RSCP in the active set, and the radio control station 30 is notified of the determination result.

Incidentally, the processing in steps S21 to S24 is preformed for all the radio base stations monitored by the mobile station.

Figure 12:
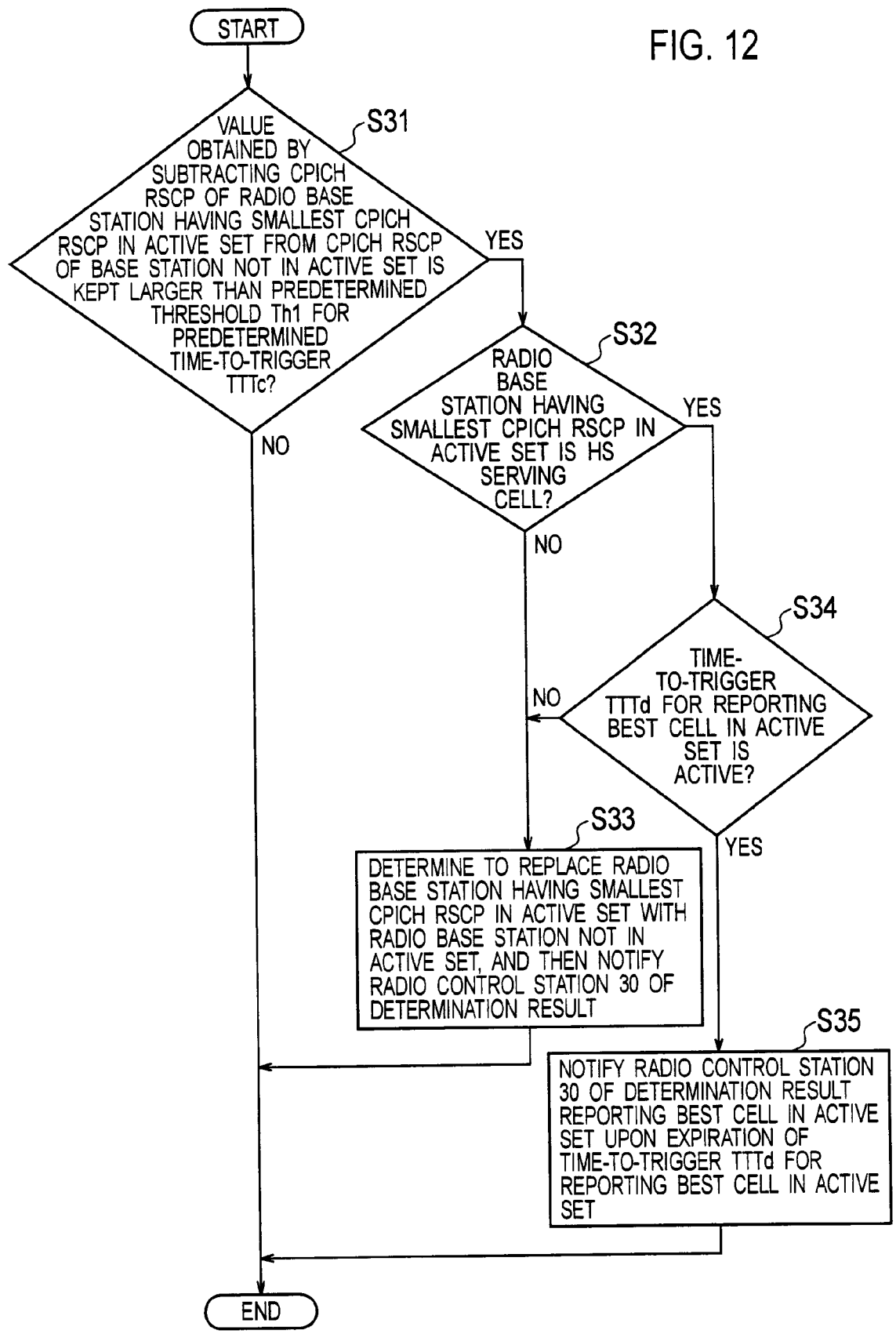
FIG. 12 is a flowchart showing a handover control method according to this embodiment (No. 5).

Yet another example of the handover control method for the mobile station according to this embodiment will be described below by using a flowchart shown in FIG. 12. Note that, in the following description, cell individual offsets described in the 3GPP TS25.331, V6.10.0 are set to 0, but a hysteresis and a time-to-trigger are set to values other than 0. In the following description, Th1 is equivalent to H1c/2 (H1c: the hysteresis parameter for the event 1c) in the 3GPP TS25.331, V6.10.0, and Th3 is equivalent to H1d/2 (H1d: the hysteresis parameter for the event 1d) in the 3GPP TS25.331, V6.10.0. In addition, TTTc denotes a time-to-trigger for a report for branch replacement, that is, the reporting event 1C, and TTTd denotes a time-to-trigger for a report of a determination related to the best cell, that is, the reporting event 1D.

Firstly, in step S31, a determination is made as to whether a value obtained by subtracting the CPICH RSCP of the radio base station having the weakest CPICH RSCP in the active set from the CPICH RSCP of the base station not in the active set is kept larger than the predetermined threshold Th1 for a predetermined time-to-trigger TTTc. Then, the processing moves to step S32 when the value obtained by subtracting the CPICH RSCP of the radio base station having the weakest CPICH RSCP in the active set from the CPICH RSCP of the base station not in the active set is kept larger than the predetermined threshold Th1 for a predetermined time-to-trigger TTTc. On the other hand, the processing is terminated (moves to end) when the value obtained by subtracting the CPICH RSCP of the radio base station having the weakest CPICH RSCP in the active set from the CPICH RSCP of the base station not in the active set is not kept larger than the predetermined threshold Th1 for a predetermined time-to-trigger TTTc.

In step S32, a determination is made as to whether the radio base station having the weakest CPICH RSCP in the active set is the HS serving cell. The processing moves to step S34 when the radio base station having the weakest CPICH RSCP in the active set is the HS serving cell, while the processing moves to step S33 when the radio base station having the weakest CPICH RSCP in the active set is not the HS serving cell.

In step S33, it is determined that the radio base station having the weakest CPICH RSCP in the active set is to be replaced with the radio base station not in the active set, and the determination result is reported to the radio control station 30.

In step S34, a determination is made as to whether or not the time-to-trigger for reporting the best cell in the active set is active. The processing moves to step S35 when the time-to-trigger TTTd for reporting the best cell in the active set is active, while the processing moves to step s33 when the time-to-trigger TTTd for reporting the best cell in the active set is not active.

Here, when the time-to-trigger TTTd for reporting the best cell in the active set is not active, the processing moves to step S33 in the above example. Instead of the processing in step S33, the processing equivalent to that in step S4 in FIG. 8 may be performed. More specifically, it is determined that the radio base station having the second weakest CPICH RSCP in the active set is to be replaced with the radio base station not in the active set, and the determination result is reported to the radio control station 30.

In the above example, when the time-to-trigger TTTd for reporting the best cell in the active set is not active, the processing moves to step S33. Alternatively, the processing equivalent to that in steps S4a and S5a may be performed. More precisely, when the radio base station having the second weakest CPICH RSCP in the active set is smaller than the CPICH RSCP of the radio base station not in the active set, it is determined that the radio base station having the second weakest CPICH RSCP in the active set is to be replaced with the radio base station not in the active set. Then, the determination result is reported to the radio control station 30. On the other hand, when the radio base station having the second weakest CPICH RSCP in the active set is not smaller than the CPICH RSCP of the radio base station not in the active set, the processing is terminated (moves to end).

In step S35, stopped is the processing for reporting, to the radio control station 30, the determination result indicating that the radio base station having the weakest CPICH RSCP in the active set is to be replaced with the radio base station not in the active set. Then, upon expiration of the time-to-trigger TTTd for reporting the best cell in the active set, the determination result indicating the best cell in the active set is reported to the radio control station 30.

Here, after the determination result indicating the best cell in the active set is reported to the radio control station 30, it is possible to perform the processing stopped in step S35 for reporting, to the radio control station 30, the determination result indicating that the radio base station having the weakest CPICH RSCP in the active set is to be replaced with the radio base station not in the active set. Alternatively, it is possible to abandon the processing stopped in step S35 for reporting, to the radio control station 30, the determination result indicating that the radio base station having the weakest CPICH RSCP in the active set is to be replaced with the radio base station not in the active set.

(Effects)

According to the mobile station and the handover control method of this embodiment, when a determination is made for the branch replacement and branch exclusion associated with the handover control using SHO, a determination result indicating the replacing or excluding of a radio base station other than the one used as the HS serving cell is reported to the radio control station. In this way, more stable HSDPA communications can be provided while a radio link to a radio base station (a radio base station making communications using an HS-PDSCH or HS-SCCH) used as the HS serving cell is prevented from being disconnected.

Accordingly, the mobile station and the handover control method of this embodiment are preferably applied to a mobile communication system in which a mobile station simultaneously communicates with multiple radio base stations by using associated-dedicated channels A-DPCHs, and communicates with only one of the multiple radio base stations by using an HS-PDSCH or HS-SCCH.

In addition, it is desirable to apply this embodiment to a mobile communication system employing HSDPA in downlink.

To be more precise, when there is a radio base station having better radio quality than the multiple radio base stations, the handover controller 114 of the mobile station according to this embodiment is able to notify the radio control station of a report indicating the exclusion of communications with one of the multiple radio base stations other than the one used as the HS serving cell, and the addition of the radio base station having better radio quality than the multiple radio base stations.

Moreover, when there is a radio base station which has better radio quality than the multiple radio base stations excluding the one used as the HS serving cell, and which is other than the multiple radio base stations, the handover controller 114 of the mobile station according to this embodiment is able to notify the radio control station of a report indicating the exclusion of communications with one of the multiple radio base stations other than the one used as an HS serving cell, and the addition of the radio base station having better radio quality than the multiple radio base stations.

In addition, when there is a radio base station having better radio quality than multiple radio base stations, and also when the radio quality of one of the multiple radio base stations other than the one used as the HS serving cell is better than that of the radio base station of the HS serving cell, the handover controller 114 is able to preferentially perform the processing of notifying the radio control station of a radio base station having the best radio quality among the multiple radio base stations, prior to the processing of notifying the radio control station of a report indicating the exclusion of communications with one of the multiple radio base stations having the poorest radio quality, and the addition of the radio base station having better radio quality than the multiple radio base stations.

Other Embodiments

Although the present invention has been described by using the above embodiment, it should not be understood that the present invention is limited to the description and drawings composing part of this disclosure. It is obvious for those skilled in the art from this disclosure that various embodiments, examples, and applied techniques can be obtained.

For example, although the CPICH RSCP is used as radio quality between the mobile station and a radio base station in the above embodiment, CPICH Ec/N0 or pathloss may be used instead of the CPICH RSCP. Here, in terms of the evaluation of radio quality, the greater the values of CPICH RSCP and CPICH Ec/N0 are, the better the radio quality is, while the smaller the value of pathloss is, the better the radio quality is.

In addition, although the foregoing embodiment shows the case using the high speed packet transmission system HSDPA in 3GPP, the present invention is not limited to the HSDPA, but can be applied to any of a mobile communication system and communication systems in which there are communication channels for communications made with multiple radio base stations and one communication channel for communications made only with one of the multiple radio base stations.

In this way, it is obvious that the present invention also includes various embodiments and the like not described in this description. Accordingly, the technical scope of the present invention is only defined by the specific subject matters of the invention according to the scope of the invention as defined by the appended claims appropriate for this disclosure.

What is claimed is:

1. A mobile station in a mobile communication system including a plurality of radio base stations and a radio control station connected to the plurality of radio base stations, comprising:
a controller configured to communicate with the plurality of radio base stations on a first communication channel and to communicate with a certain one of the plurality of radio base stations a second communication channel, and to maintain communications with the certain one of the plurality of radio base stations communicating by using the second communication channel, and wherein the controller maintains communications even when the radio quality of the certain radio base station communicating by using the second communication channel becomes deteriorated to a condition where the certain radio base station should be excluded from an active set such that the controller maintains the communications on the first communication channel and the second communication channel with the certain radio base station without excluding the certain radio base station from the active set.

2. The mobile station according to claim 1, further comprising a notification unit configured to notify the radio control station of an exclusion of communications with one of the plurality of radio base stations other than the one communicating by using the second communication channel, and an addition of a radio base station having better radio quality than the plurality of radio base stations, when the radio base station having better radio quality than the plurality of radio base stations exists.

3. The mobile station according to claim 2, wherein, when there is a radio base station which is other than the plurality of radio base stations, and which has better radio quality than the plurality of radio base stations other than the one communicating by using the second communication channel, the notification unit notifies the radio control station of an exclusion of communications with one of the plurality of radio base stations other than the one communicating by using the second communication channel, and an addition of communications with the radio base station having better radio quality than the plurality of radio base stations.

4. A mobile station in a mobile communication system including a plurality of radio base stations and a radio control station connected to the plurality of radio base stations, comprising:
a notification unit configured to preferentially carry out the processing of notifying the radio control station of a radio base station having the best radio quality among the plurality of radio base stations, prior to the processing of notifying the radio control station of an exclusion of communications with the radio base stations having the poorest radio quality among the plurality of radio base stations and an addition of communications with a radio base station having better radio quality than the plurality of radio base stations, and wherein the notification unit preferentially carries out the processing when the mobile station simultaneously communicates with the plurality of radio base stations by using first communication channels and communicates only with a certain one of the radio base stations by using a second communication channel, when the radio base station having better radio quality than the plurality of radio base stations exists, and when the radio quality of the plurality of radio base stations other than the one communicating by using the second communication channel is better than that of the certain radio base station communicating by using the second communication channel, and when a time-to-trigger for reporting the radio base station with the best radio quality among the plurality of radio base stations to the radio control station is active; and
a controller configured to maintain communications even when the radio quality of the certain radio base station communicating by using the second communication channel becomes deteriorated to a condition where the certain radio base station should be excluded from an active set such that the controller maintains the communications on the first communication channel and the second communication channel with the certain radio base station without excluding the certain radio base station from the active set.

5. The mobile station according to any one of claims 1 to 4, wherein the first communication channel is an associated-dedicated channel A-DPCH, and the second communication channel is any one of an HS-PDSCH and HS-SCCH.

6. The mobile station according to any one of claims 1 to 4, wherein the mobile communication system employs HSDPA for downlink.

7. A handover control method used in a mobile communication system including a mobile station, a plurality of radio base stations making radio communications with the mobile station, and a radio control station connected to the plurality of radio base stations, the method comprising:
the step of maintaining communications with a certain one of the plurality of radio base stations communicating by using a second communication channel, and wherein, the step is carried out when the mobile station simultaneously communicates with the plurality of radio base stations by using a first communication channel and communicates only with the certain radio base station by using the second communication channel, and even when the radio quality of the certain radio base station communicating by using the second communication channel becomes deteriorated to a condition where the certain radio base station should be excluded from an active set such communications are maintained on the first communication channel and the second communication channel with the certain radio base station without excluding the certain radio base station from the active set.

8. The mobile station according to claim 1, wherein a number of the plurality of radio base stations is three.

9. The mobile station according to claim 1, wherein the controller replaces a radio base station in the active set having a second smallest radio quality with a radio base station not in the active set when the certain radio base station has the smallest radio quality in the active set and the radio base station not in the active set has a radio quality greater than the smallest radio quality by at least a threshold.

* * * * *